United States Patent
Hughbanks et al.

(10) Patent No.: US 6,288,880 B1
(45) Date of Patent: Sep. 11, 2001

(54) METHOD OF MAKING TIC MR-HEAD MAGNETIC SHIELD DUMMY SHIELD SPARK GAP

(75) Inventors: Timothy Scott Hughbanks, Morgan Hill; Neil Leslie Robertson, Campbell, both of CA (US); Steven Howard Voldman, Burlington, VT (US); Albert John Wallash, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/433,900

(22) Filed: Nov. 4, 1999

Related U.S. Application Data

(62) Division of application No. 08/959,406, filed on Oct. 28, 1997, now Pat. No. 6,081,409, which is a division of application No. 08/480,069, filed on Jun. 7, 1995, now Pat. No. 5,761,009.

(51) Int. Cl.$^7$ .................................................. G11B 5/127
(52) U.S. Cl. ............................................. 360/323; 360/128
(58) Field of Search .................................. 360/313, 314, 360/319, 328, 323, 128

(56) References Cited

U.S. PATENT DOCUMENTS

| | | |
|---|---|---|
| 3,940,797 | 2/1976 | Brock et al. . |
| 4,663,685 | 5/1987 | Tsang . |
| 4,879,610 * | 11/1989 | Jove et al. ............................ 360/113 |
| 4,907,113 * | 3/1990 | Mallary ................................ 360/113 |
| 4,918,554 | 4/1990 | Bajorek et al. . |
| 4,935,832 | 6/1990 | Das et al. . |
| 5,103,553 * | 4/1992 | Mallary ................................ 360/113 |
| 5,111,352 * | 5/1992 | Das et al. ............................. 360/113 |
| 5,272,582 | 12/1993 | Shibata et al. . |
| 5,323,285 | 6/1994 | Smith . |
| 5,465,186 * | 11/1995 | Bajorek et al. ...................... 360/113 |
| 5,491,605 * | 2/1996 | Hughbanks et al. ................. 360/113 |
| 5,539,598 * | 7/1996 | Denison et al. ...................... 360/113 |
| 5,761,009 * | 6/1998 | Hughbanks et al. . |

OTHER PUBLICATIONS

IBM Technical Disclosure Bulletin, "Electrostatic Shielding For Magnetoresistive Read Heads", vol. 21, No. 11, Apr. 1979.

* cited by examiner

Primary Examiner—Allen T. Cao
(74) Attorney, Agent, or Firm—Gray Cary Ware & Freidenrich; Ervin F. Johnston

(57) ABSTRACT

A magneto-resistive read head having a "parasitic shield" provides an alternative path for currents associated with sparkovers, thus preventing such currents from damaging the read head. The parasitic shield is provided in close proximity to a conventional magnetic shield. The electrical potential of parasitic shield is held essentially equal to the electrical potential of the sensor element. If charges accumulate on the conventional shield, current will flow to the parasitic shield at a lower potential than would be required for current to flow between the conventional shield and the sensor element. Alternatively, conductive spark gap devices are electrically coupled to sensor element leads and to each magnetic shield. Each spark gap device is brought within very close proximity of the substrate to provide an alternative path for charge that builds up between the sensor element and the substrate to be discharged. The ends of the spark gaps that are brought into close proximity of the substrate are preferably configured with high electric field density inducing structures which reduce the voltage required to cause a sparkover between the spark gap device and the substrate.

11 Claims, 13 Drawing Sheets

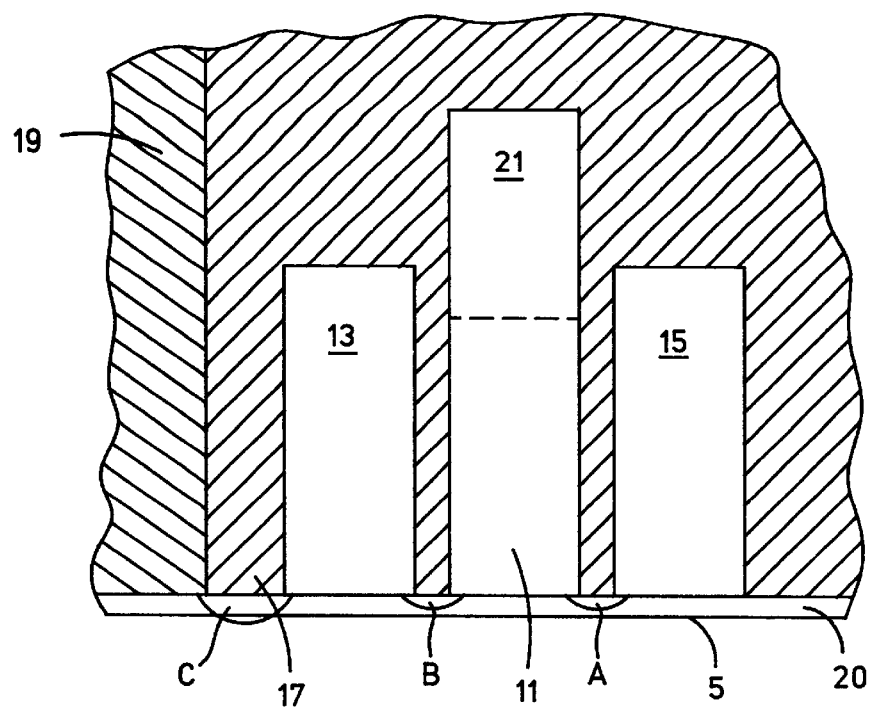
FIG. 3 (Prior Art)
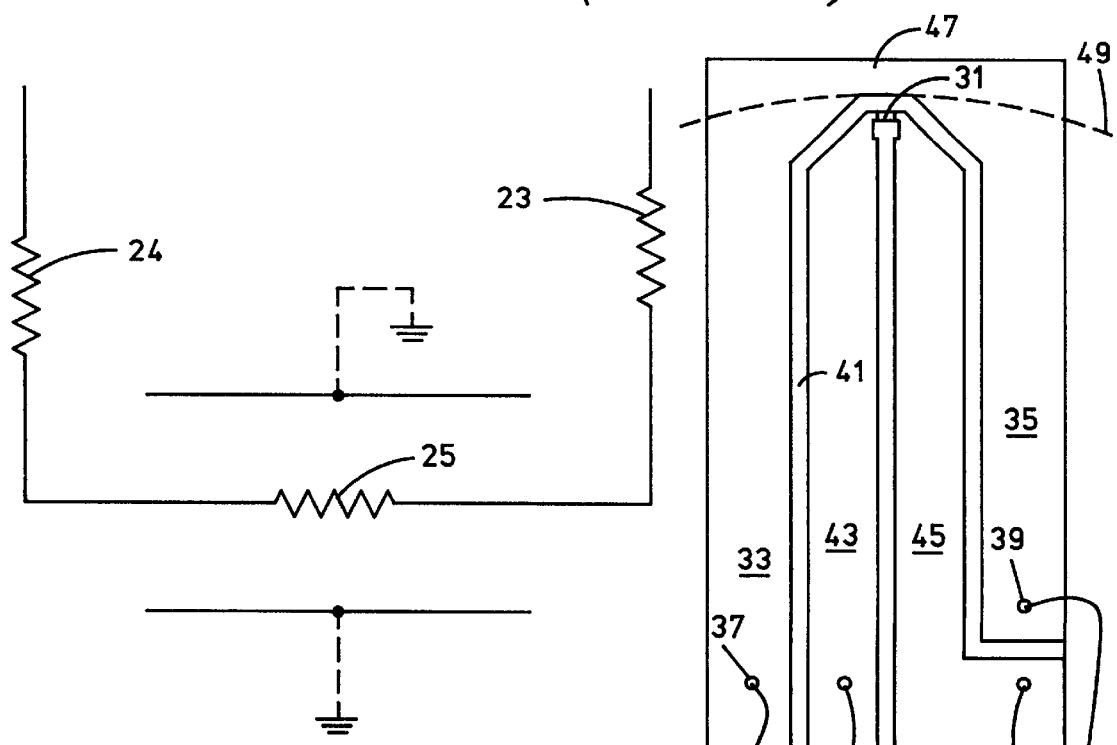
FIG. 4 (Prior Art)
FIG. 5 (Prior Art)

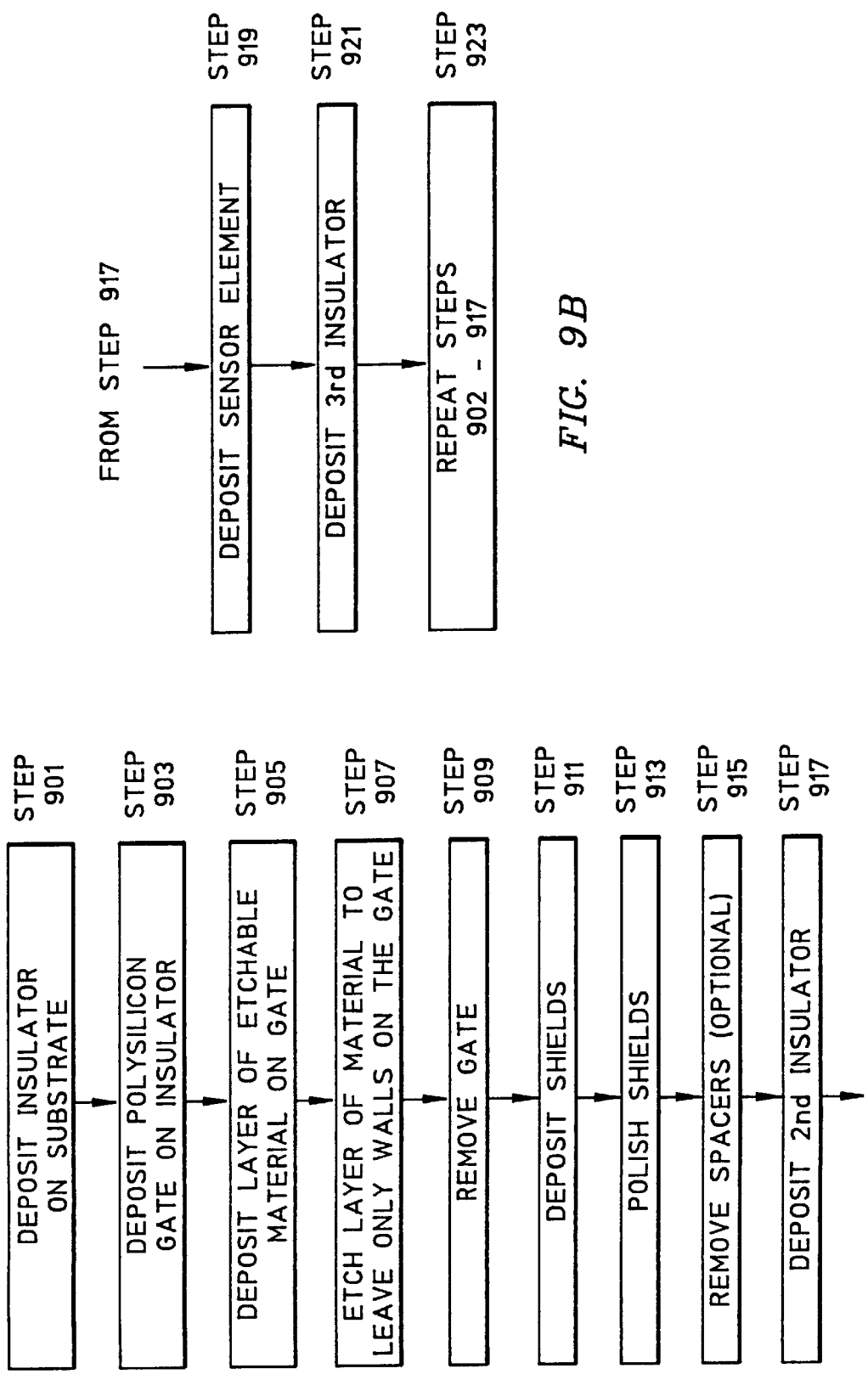

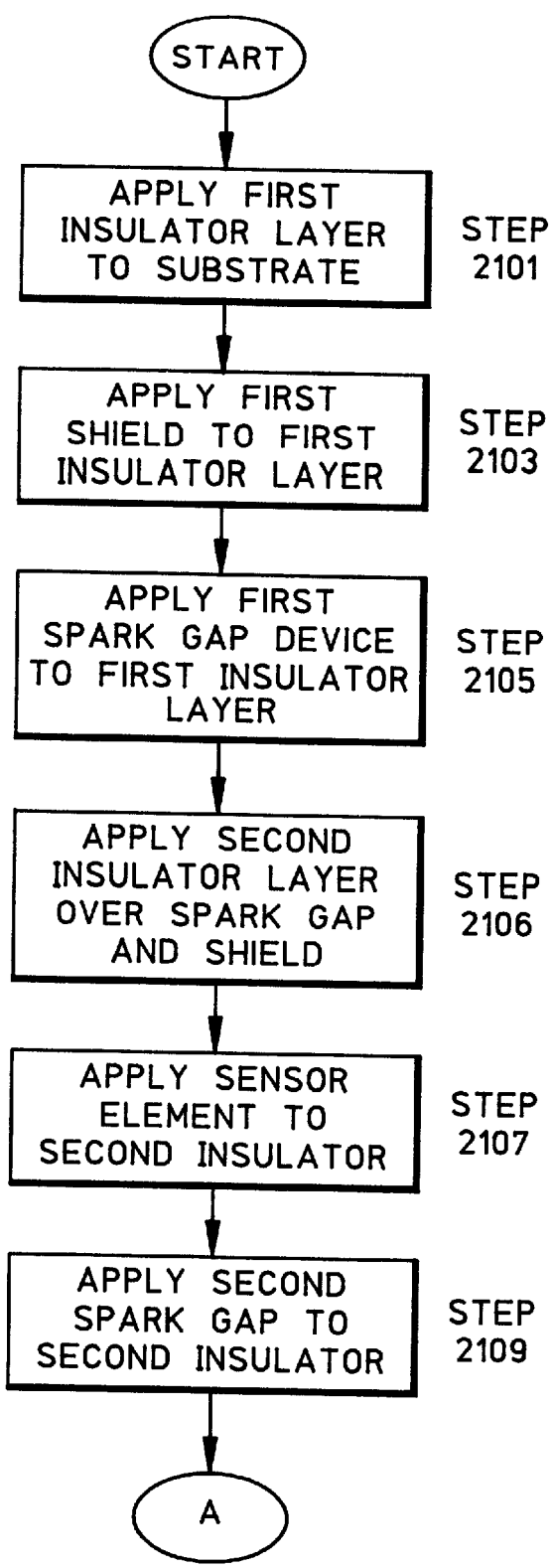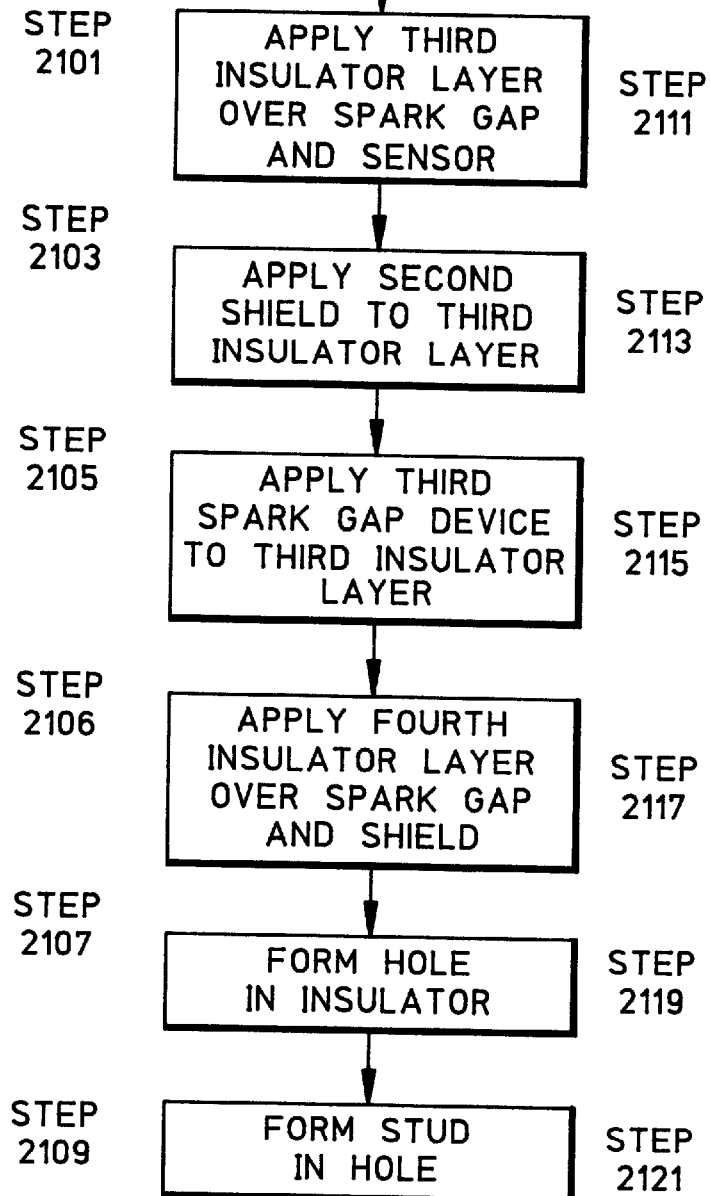
FIG. 21a                    FIG. 21b

METHOD OF MAKING TIC MR-HEAD MAGNETIC SHIELD DUMMY SHIELD SPARK GAP

CROSS REFERENCE TO RELATED APPLICATION

This application is a divisional application of application Ser. No. 08/959,406, U.S. Pat. No. 6,081,409 filed Oct. 28, 1997 which is a divisional application of application Ser. No. 08/480,069, U.S. Pat. No. 5,761,009 filed Jun. 7, 1995.

BACKGROUND OF THE INVENTION

1. Field of the Invention

The present invention relates generally to read heads for computer data storage devices. In particular, the invention concerns a structure for protecting a read head from electrostatic discharge.

2. Description of the Related Art

Data storage devices, such as magnetic disk drives and tape drives, used to store information for computer systems are well known. In magnetic data storage devices, a medium, such as a magnetic disk platter or magnetic tape, is treated with magnetic material. The magnetic material can be polarized in order to cause phase reversals in a magnetic field to encode information on the medium. The phase reversals used to encode information can be detected by magnetic sensors, commonly referred to as read heads. It is common for a read head to be mounted in a structure, commonly referred to as a slider. Sliders typically fly over the surface of the medium supported by a thin layer of air, commonly referred to as an air bearing. The air bearing is generated by relative motion of the slider with respect to the medium. For example, in a disk drive device, the disk platter is rotated to generate relative motion between the medium and the slider. The slider may be positioned radially over the medium to allow the read head access to any region of the medium as the medium rotates. FIG. 1 is an illustration of a slider 1 having two rails 3. Each rail 3 has an air bearing surface 5. A read head 7 is located on a "deposition end" 4 of each rail. The slider 1 moves in the direction of arrow 9 relative to a magnetic medium.

One well known type of read head is referred to as a magneto-resistive ("MR") head. An MR head uses magneto-resistive material (commonly referred to as an "MR sensor element") to sense changes in a local magnetic field. FIG. 2 is a simplified illustration of a cross-section of an MR read head 7 within a rail 3 of a slider 1, viewed from the air bearing surface 5. The arrow 9 indicates the direction of the read head 7 with respect to the medium over which the read head 7 flies. An MR sensor element 11 is shown disposed between a first magnetic shield 13 and a second magnetic shield 15. The first and second shields 13, 15 are typically formed of a magnetic material, such as a nickel/iron alloy, which prevents the magnetic fields of adjacent regions of the medium from distorting the fields associated with the information that is being read from the medium. Surrounding each shield 13, 15 and the MR sensor element 11 is an insulating material 17, such as alumina. The insulator 17 prevents the MR sensor element 11 from coming into direct electrical contact with either the first or second shield 13, 15. Also shown in FIG. 2 is a substrate 19. The substrate 19 may be a ceramic material, such as titanium carbide.

FIG. 3 is a cross-sectional view through line 3—3 of the read head 7 shown in FIG. 2. The MR sensor element 11 (shown by broken line to indicate that the sensor 11 is obscured by a sensor lead 21) is coupled to additional circuitry, which is well known in the art, by sensor leads 21 (only one such lead 21 is shown on the near side of the MR sensor element 11). A second lead (not shown) is coupled to another side of the MR sensor element 11. A carbon overcoat 20 may be applied to the air bearing surface 5 to minimize wear and protect the relatively soft shields 13, 15 and MR sensor element 11 from damage. The overcoat 20 has little effect on the likelihood that a sparkover will occur at the air bearing surface 5.

One problem with MR heads, such as the head 7 shown in FIGS. 1–3 is that electrostatic charges may be transferred from an external source (such as a human body) to the components of the MR read head 7 (such as the shields 13, 15, MR sensor element 11, and substrate 19) during production. When the charge transferred to one component is sufficiently large, an electrical discharge, commonly referred to as a "sparkover" occurs. Such sparkovers are most likely to occur during production and handling of the head 7.

Sparkovers can damage the head. For example, the high current density at the sparkover location typically results in material near the sparkover melting. This damage may occur at the air bearing surface 5 of the slider 1. In a high percentage of MR read heads in which sparkover damage at the air bearing surface 5 occurs, the result of the sparkover damage is either increased resistance, or alternatively, a near open circuit condition in the MR sensor element circuit. In addition, damage to the air bearing surface 5 results in undesirable changes in the flying height characteristics of the slider 1. That is, even the minor changes in the surface characteristics of the air bearing surface 5 have a great impact on the flying height characteristics of the slider 1. Because of the undesirable effects of sparkovers, the manufacturing yield for MR read heads is reduced in proportion to the frequency with which such sparkovers typically occur.

Studies of such electro-static discharges have revealed that these discharges typically occur in one of three regions. These three regions are indicated in FIG. 3 by the letters "A", "B", and "C". As shown in FIG. 3, the regions of discharge are typically alone the air bearing surface 5 (even when a carbon overcoat 20 is provided) due to a higher electric field generated in the air bearing.

FIG. 4 illustrates an electrical model of the circuit formed by the elements of the MR head 7. The resistance of the leads 21 to and from the MR sensor element 11 is modeled as two resistors 23, 24. The resistance of the MR sensor element 11 is modeled as a resistor 25. One method for preventing damage due to electro-static discharge is taught by U.S. Pat. No. 5,272,582, entitled "Magneto-Resistance Effect Magnetic Head with Static Electricity Protection", issued to Shibata, et. al on Dec. 12, 1993. In Shibata, two sensor element magnetic cores are deposited to form a magnetic gap near the air bearing surface of a slider. The two magnetic cores are in magnetic contact with one another at a "back gap" which is away from the magnetic gap. An insulating layer is placed between each sensor element magnetic core at the magnetic gap. An MR sensor element is place between the insulating layers such that the MR sensor element is within the magnetic gap. A ground conductive layer is electrically connected to a first of the magnetic cores to route to ground the electric charges coming into the magnetic gap from the magnetic recording medium. Accordingly, Shibata attempts to keep the magnetic cores which form the magnetic gap at a controlled potential. This arrangement is intended to prevent electric charges that may come from the magnetic recording medium from rushing into the magnetic gap.

A second method for preventing electro-static discharge and the associated damage that such discharge causes is taught in IBM Technical Disclosure Bulletin, Vol. 21, No. 11, dated April, 1979, by Rohen (hereinafter referred to as "Rohen"). FIG. 5 illustrates the approach taken by Rohen. In FIG. 5, an MR element 31 is located at one end of the structure. A first conductive region 33 and a second conductive region 35 are electrically coupled to a ground potential via terminals 37, 39. An insulating material 41 isolates these regions 31, 33 from two additional conductive regions 43, 45. Regions 43, 45 provide a conductive path for current to the MR element 31. During fabrication, the upper portion 47 of the structure is removed to the broken line 49. By coupling the regions 33, 35 to a ground potential, a low potential point is provided for any direct electrostatic discharges, and the grounded side bars formed by the regions 33, 35 provide a Faraday shield to lessen the effect of indirect electrostatic discharges.

A third method for preventing electro-static discharge and the associated damage that such discharge causes, requires providing an alternative path for a sparkover. This method has been used with conventional inductive read/write heads. For example, in a typical inductive read/write head, the inductive coil is greater than approximately 3 µm from the yoke. The dielectric between the inductive coil and the yoke is typically an insulator, such as alumina ($Al_2O_3$). A spark gap device is formed which causes a sparkover from the inductive coil or the yoke in order to reduce any electro-static charge that builds on these components. Such a spark gap device is placed close to a component to be discharged. The charge built up on the component will cause a sparkover to the spark gap device at a lower voltage than is required to cause a sparkover to any other component. For example, in a conventional inductive read/write head, a spark gap device would be located approximately 1 µm from the component to be discharged. Thus, a sparkover will occur at a substantially lower voltage than is required for a sparkover across the 3 µm gap between the yoke and inductive coil.

However, because of the relatively short distance between the components of an MR read head, the voltage at which a sparkover occurs between those components is relatively low. For example, the voltage required to cause a sparkover (i.e., the "sparkover voltage") between an MR sensor lead and a grounded magnetic shield separated by 0.12 µm is only 60 volts.

In contrast, in a typical MR head (such as the head 7 shown in FIG. 1) the distance between one of the magnetic shields 13, 15 and the MR sensor element 11 is approximately 0.12 µm. Therefore, a sparkover will occur between the magnetic shields 13, 15 and MR sensor element 11 of a conventional MR read head at a far lower voltage than between the yoke and inductive coil in a conventional inductive read/write head. Furthermore, because the sparkover between components of the MR read head 7 can occur though air at the air bearing surface, the required sparkover voltage between the magnetic shields 13, 15 and the MR sensor element 11 is even lower than would be the case if the sparkover had to traverse an insulator. Accordingly, it would be very difficult to develop a spark gap device which would provide an alternative path for discharge of any charge that builds on the components of an MR read head (i.e., a path through which a sparkover can be induced by a weaker electric field than is required to cause a sparkover between the components of the MR read head). For example, voltages in excess of 1000 volts are required to cause a sparkover between a yoke and inductive coil in a conventional inductive device. In contrast, 60 volts can cause a sparkover between an MR sensor lead and a grounded magnetic shield separated by 0.12 µm. This difference is due to the relatively short distance across the gap between the MR sensor lead and the magnetic shield, and also due to the fact that the components of an MR read head are essentially exposed to air at the air bearing surface. The dielectric constant for air is such that sparkover will occur at lower voltages across air than across many other materials.

While the solutions provided by Rohen and Shibata reduce the chance of damage to an MR read head occurring, damage due to sparkovers (particularly at the air bearing surface) remain a persistent problem which undesirably effects manufacturing yield. Accordingly, it is an object of the present invention to provide a structure that is less susceptible to harmful sparkovers at the air bearing surface. Another object of the present invention is to provide an inexpensive structure which is less susceptible to damage from sparkovers at the air bearing surface. Still another object of the present invention is to provide a method for efficiently fabricating a structure that is less susceptible to damage from sparkovers at the air bearing surface.

SUMMARY OF THE INVENTION

The present invention is a magneto-resistive read head used to sense magnetic fields which emanate from a magnetic storage medium, such as a platter of a computer disk drive device or magnetic tape used in a tape drive. In accordance with one embodiment of the present invention, "parasitic shields" are placed in close proximity to magnetic shields of a read head. The gap between a parasitic shield and a magnetic shield is preferably narrower than the gap between a magnetic shield and either the substrate on which the read head is formed, or a sensor element. Accordingly, a parasitic shield provides an alternative path for currents associated with sparkovers, thus preventing such currents from damaging the read head.

Each of the parasitic shields is electrically coupled to the sensor element through a resistive element. Therefore, the electrical potential of parasitic shield will be essentially equal to the electrical potential of the sensor element. Accordingly, if charges accumulate on the magnetic shield, current will flow to the parasitic shield at a lower potential than would be required for current to flow between the magnetic shield and the sensor element. Alternatively, the parasitic shields may be directly electrically coupled to a structure of known electrical potential, such as the substrate.

In accordance with a second embodiment of the present invention, conductive spark gap devices are electrically coupled to sensor element leads and to each magnetic shield. Each spark gap device is brought into very close proximity of the substrate to provide an alternative path for charges that build up between the sensor element and the substrate to be discharged. In accordance with one embodiment of the present invention, the spark gap devices are fabricated at the wafer level on a deposition end of a wafer of semiconductor substrate material using photolithography and masking techniques. In one embodiment of the present invention, pads at the deposition end may be connected to the substrate and shields to allow external connections to be made.

In the preferred embodiment of the present invention, the ends of the spark gaps that are brought into close proximity with the substrate are configured with high electric field density inducing structures which reduce the voltage required to cause a sparkover between the spark gap device and the substrate. Alternatively, the spark gap devices may be directly coupled to the substrate and brought into close proximity with the magnetic shields and the sensor element.

The details of the present invention, both as to its structure and operation, can best be understood in reference to the accompanying drawings, in which like reference numerals refer to like parts, and in which:

BRIEF DESCRIPTION OF THE DRAWING

FIG. 3 is a partial cross-sectional view of a prior art MR read head taken along line 3—3 of FIG. 2;

FIG. 4 is a model of the electrical circuit formed by the prior art MR head shown in FIGS. 2 and 3;

FIG. 5 is an illustration of a prior art MR head with grounded side bars;

FIG. 6c is a cross-sectional view of the inventive read head taken along the line 6c—6c of FIG. 6a;

FIGS. 9A and 9B is a flowchart of the process steps performed in the inventive method;

FIG. 18b is a cross-sectional view of the embodiment of the present invention taken along the line 18b–18b of FIG. 18a.

FIGS. 21a and 21b are flowcharts of the method of fabricating the read head of FIG. 18a in accordance with one embodiment of the present invention.

DETAILED DESCRIPTION OF THE PREFERRED EMBODIMENTS

Figure 22:
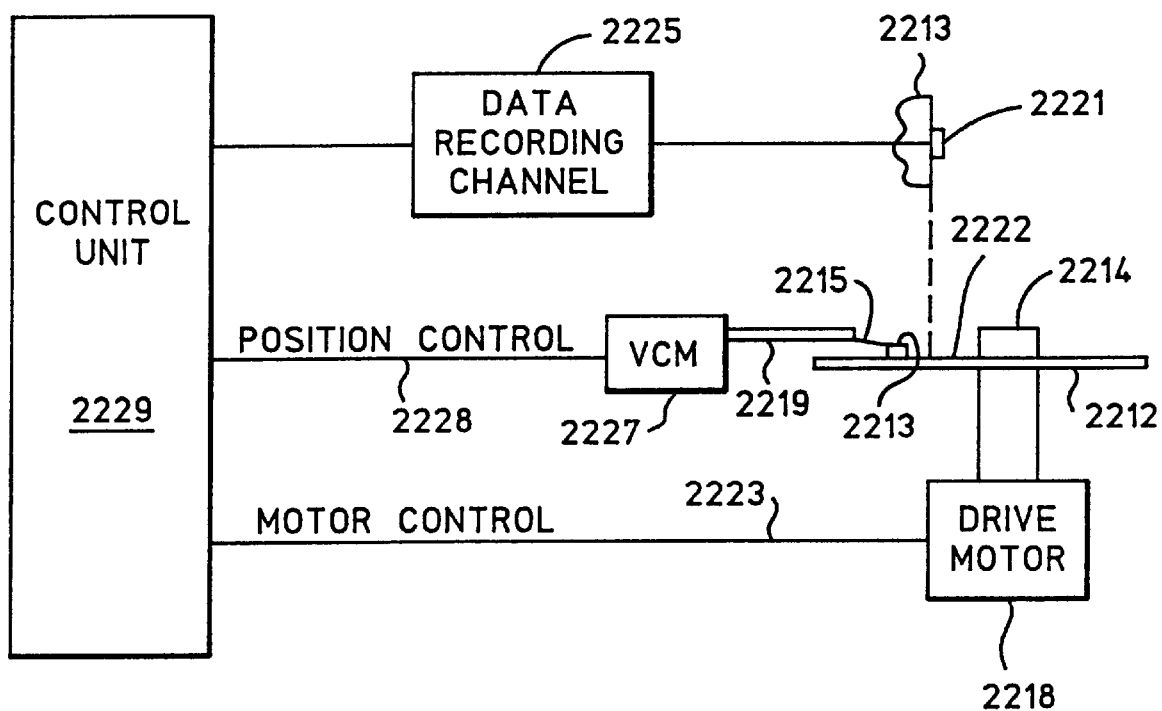
FIG. 22 is a magnetic disk storage system.

FIG. 22 is a magnetic disk storage system. It will be apparent to one of ordinary skill that the present invention, while described as being for use in a magnetic disk storage system, may be used in any data storage system in which the inventive head is used, such as magnetic tape recording systems, etc. At least one rotatable magnetic disk 2212 is supported on a spindle 2214 and rotated by a disk drive motor 2218. The magnetic recording media on each disk is in the form of an annular pattern of concentric data tracks (not shown) on the disk 2212. At least one slider 2213 is positioned on the disk 2212, each slider 2213 supporting one or more magnetic read/write transducers 2221, typically referred to as read/write heads. As the disks rotate, the sliders 2213 are moved radially in and out over the disk surface 2222 so that the heads 2221 may access different portions of the disk where desired data is recorded. Each slider 2213 is attached to an actuator arm 2219 by means of a suspension 2215. The suspension 2215 provides a slight spring force which biases the slider 2213 against the disk surface 2222. Each actuator arm 2219 is attached to an actuator means 2227. The actuator means as shown in FIG. 22 may be a voice coil motor (VCM), for example. The VCM comprises a coil moveable within a fixed magnetic field, the direction and velocity of the coil movements being controlled by the motor current signals supplied by a controller.

During operation of the disk storage system, the rotation of the disk 2212 generates an air bearing between the slider 2213 and the disk surface 2222 which exerts an upward force (i.e., lift) on the slider. The air bearing thus counterbalances the slight spring force of the suspension 2215 and supports the slider 2213 off and slightly above the disk surface by a small, substantially constant spacing during operation.

The various components of the disk storage system are controlled in operation by control signal generated by control unit 2229, such as access control signals and internal clock signals. Typically, the control unit 2229 comprises logic control circuits, storage means and a microprocessor, for example. The control unit 2229 generates control signals to control various system operations such as drive motor control signals on line 2223 and head position and seek control signals on line 2228. The control signals on line 2228 provide the desired current profiles to optimally move and position a selected slider 2213 to the desired data track on the associated disk 2212. Read and write signals are communicate to and from read/write heads 2221 by means of recording channel 2225.

The above description of a typical magnetic disk storage system, and the accompanying illustration of FIG. 22, are provided only as one illustration of the present invention. It should be apparent that disk storage systems may contain a large number of disks and actuators, and each actuator may support a number of sliders.

Figure 1:
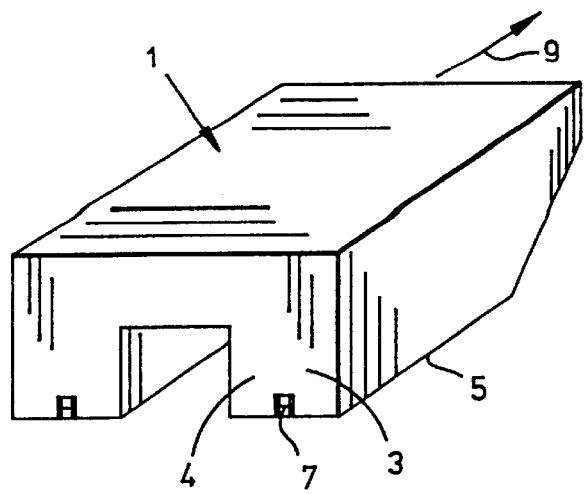
FIG. 1 is a perspective view of a prior art slider used in a conventional computer disk drive device.
Figure 2:
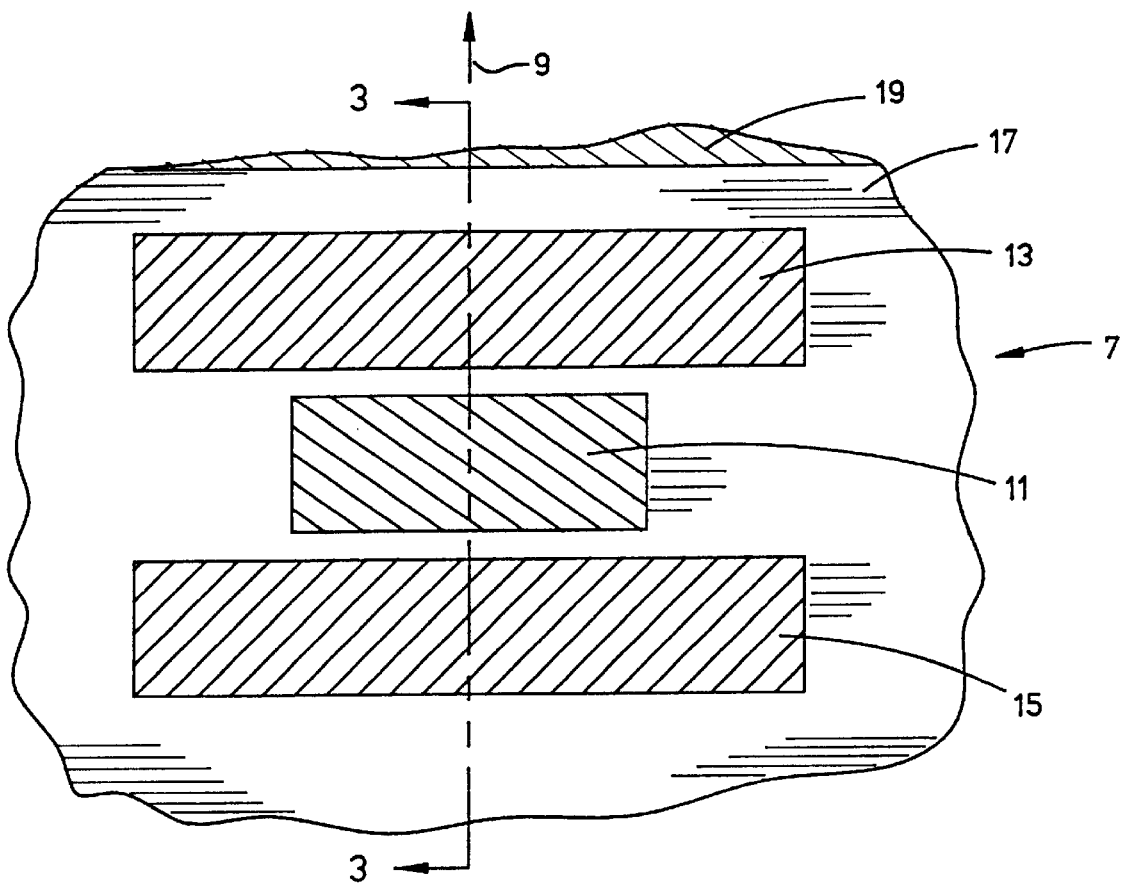
FIG. 2 is a partial cross-sectional view of a prior art MR read head, viewed from the air bearing surface.
Figure 6A:
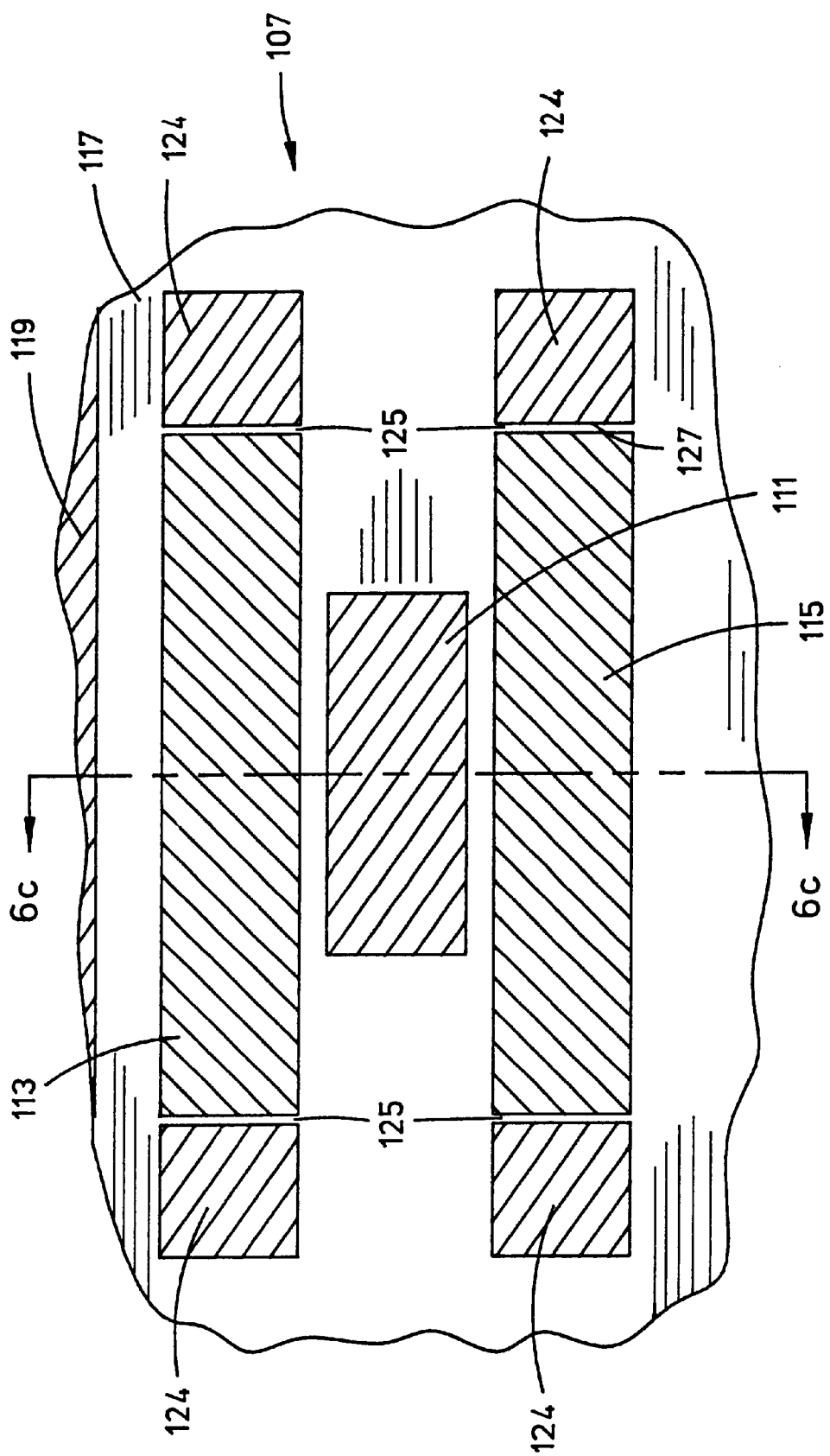
FIG. 6a is a partial cross-sectional view of an MR read head in accordance with one embodiment of the present invention.

FIG. 6a is a partial cross-sectional view of a magnetoresistive ("MR") read head 107 in accordance with a first embodiment of the present invention. The MR read head 107 of FIG. 6a is fabricated on a substrate 119. The substrate 119 may be fabricated from any suitable conventional material used to fabricate sliders, such as titanium carbide ceramic. It will be understood by those of ordinary skill in the art that the particular substrate material is not essential to the present invention. For example, in an alternative embodiment of the present invention, the substrate may be either a conductive material (such as ferrite, or ferrite composition), semiconductor material (such as silicon single crystal), or insulating material (such as alumina). The MR read head 107 includes a first magnetic shield 113, a second magnetic shield 115, a sensor element 111, four parasitic shields 124, each parasitic shield 124 formed in close proximity to one of the magnetic shields 113, 115.

Figure 6B:
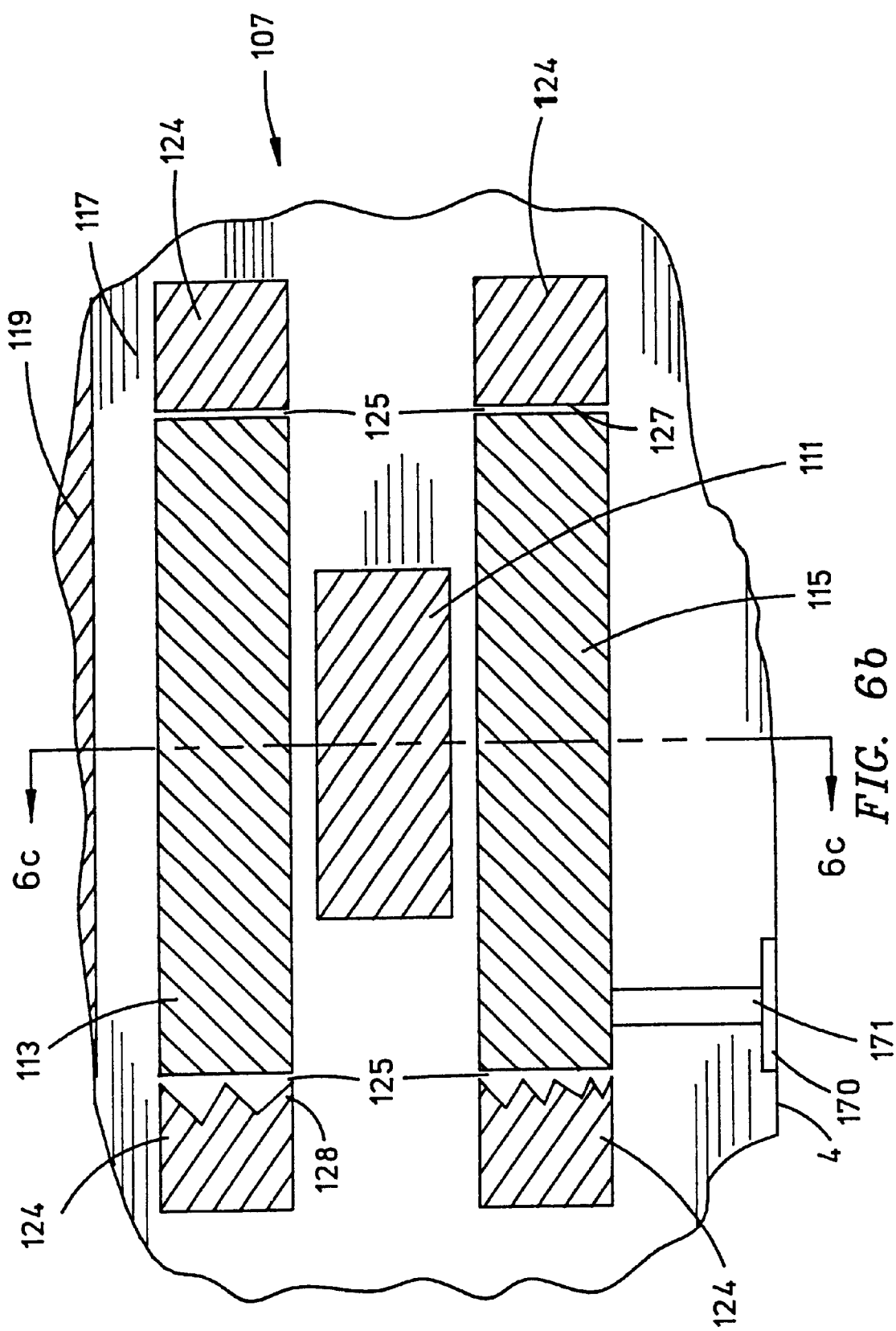
FIG. 6b is a partial cross-sectional view of an MR read head in accordance with another embodiment of the present invention.

In one embodiment of the present invention, shown in FIG. 6a, the proximal end 127 of each parasitic shield 124 generally conforms to the shape of the nearby end of the magnetic shield 113, 115. Alternatively, the proximal end 127 of each parasitic shield 124 may have high electric field density inducing structures (HEFDI structures). For example, as shown in FIG. 6b, the proximal end 127 of each parasitic shield 124 may be formed with one or more HEFDI structures, such as a generally pointed structure (i.e., structure preferably with a radius of less than about 1 µm) which causes the electric field intensity to be concentrated. It will be understood by those skilled in the art, that structures with radii of greater than 1 µm may be used. However, the smaller the radius, the greater the concentration of charge. Due to the concentration of electric fields in the HEFDI structures, the likelihood of a sparkover between a parasitic shield 124 and a magnetic shield 113, 115 increases. Accordingly, sparkovers are less likely to occur between the magnetic shield 113, 115 and either the sensor element 111 or between the magnetic shield 113, 115 and the substrate 119. A single HEFDI structure may be provided. However, a plurality of such HEFDI structures are preferable, since a high current density sparkover may distort a single HEFDI structure, thereby reducing the ability of the HEFDI to concentrate the electric field. By having more than one such HEFDI structure, occurrence of more than one high current sparkover through a HEFDI structure will be possible, even if the sparkover causes damage to the structure through which current flows. A tradeoff between space available in the read head and the number of HEFDI structures requires that the particular preferred number of HEFDI structures be selected after consideration of the dimensions of the read head and the likelihood of multiple sparkovers.

FIG. 6b illustrates an alternative embodiment in which a special pad 170 is electrically coupled to the magnetic shield 115 by a conductive element 171. Additional conductive elements (not shown) may be used to electrically couple other components of the read head 107 to additional pads (not shown) in similar fashion.

Figure 6C:
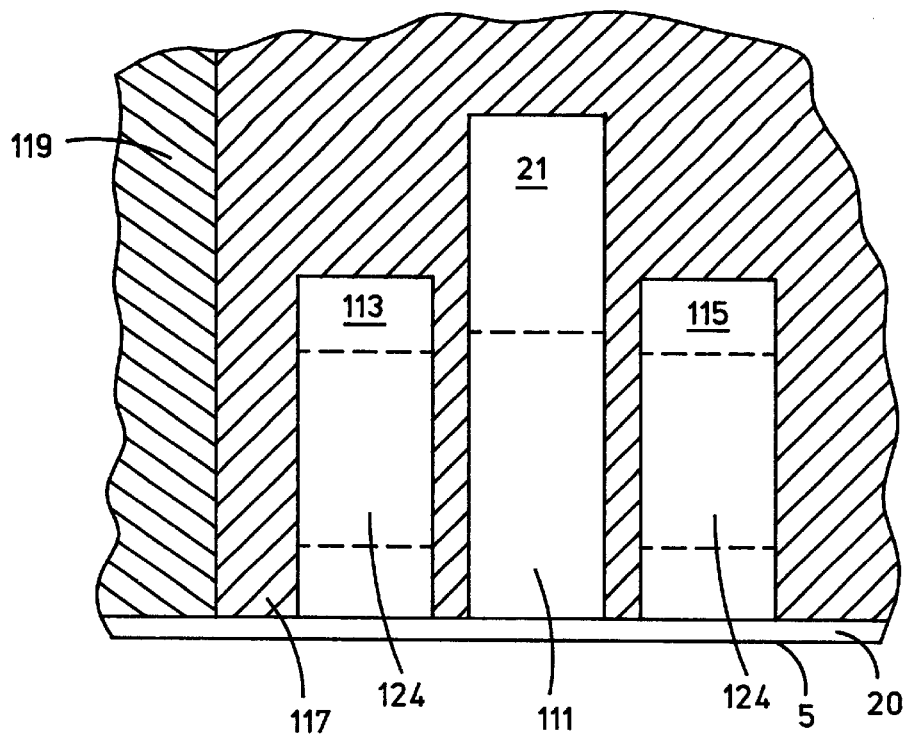

FIG. 6c is a cross-sectional view of the read head 107 taken along the line 6c—6c of FIG. 6a. FIG. 6c reveals that the parasitic shields 124 do not extend near the air bearing surface 5. By forming the parasitic shields 124 well above the air bearing surface (i.e., preferably about twice the distance between the parasitic shield 124 and the magnetic shield 115) the chance that a sparkover will occur at the air bearing surface is substantially reduced.

In one embodiment of the present invention, each magnetic shield 113, 115 is fabricated from a nickel/iron alloy, commonly known as permalloy. Alternatively, the magnetic shields 113, 115 may be fabricated from any relatively permeable material (such as ferrite). In the preferred embodiment of the present invention, the parasitic shields 124 are fabricated from the same material as the magnetic shields 113, 115 to allow at least one parasitic shield to be formed by the same process step which forms a magnetic shield. Alternatively, the parasitic shields 124 may be fabricated from any conductive material.

The parasitic shields 124 are preferably electrically coupled to the sensor element through a conduction path. In one embodiment of the present invention, approximately 10–100 kilohms of resistance is provided in the conductive path between each parasitic shield and one of two conventional sensor element 111 leads 21 (see FIG. 7a). The sensor element leads 21 allow current to flow to and from the sensor element 111. One of the sensor element leads 21 hides the sensor element 111 in FIG. 6c. The sensor element 111 is, therefore, illustrated by a broken line.

A spark gap 125 exists between each of the magnetic shields 113, 115 and at least one of the parasitic shields 124. In the preferred embodiment, two spark gaps 125 are associated with each magnetic shield 113, 115, one on each side of each magnetic shield 113, 115. The spark gaps 125 are preferably formed such that current will flow across the spark gaps 125 before current flows between a magnetic shield 113, 115 and either the sensor element 111 or the substrate 119. That is, the spark gaps 125 are narrower than the gap between the sensor element 111 and the magnetic shields 113, 115. Accordingly, any sparkover that occurs due to excessive charge that builds up between one of the magnetic shields 113, 115 and the sensor element 111 will be discharged across the spark gap 125 by a sparkover between the magnetic shield 113, 115 and one or both of the associated parasitic shields 124.

Figure 7A:
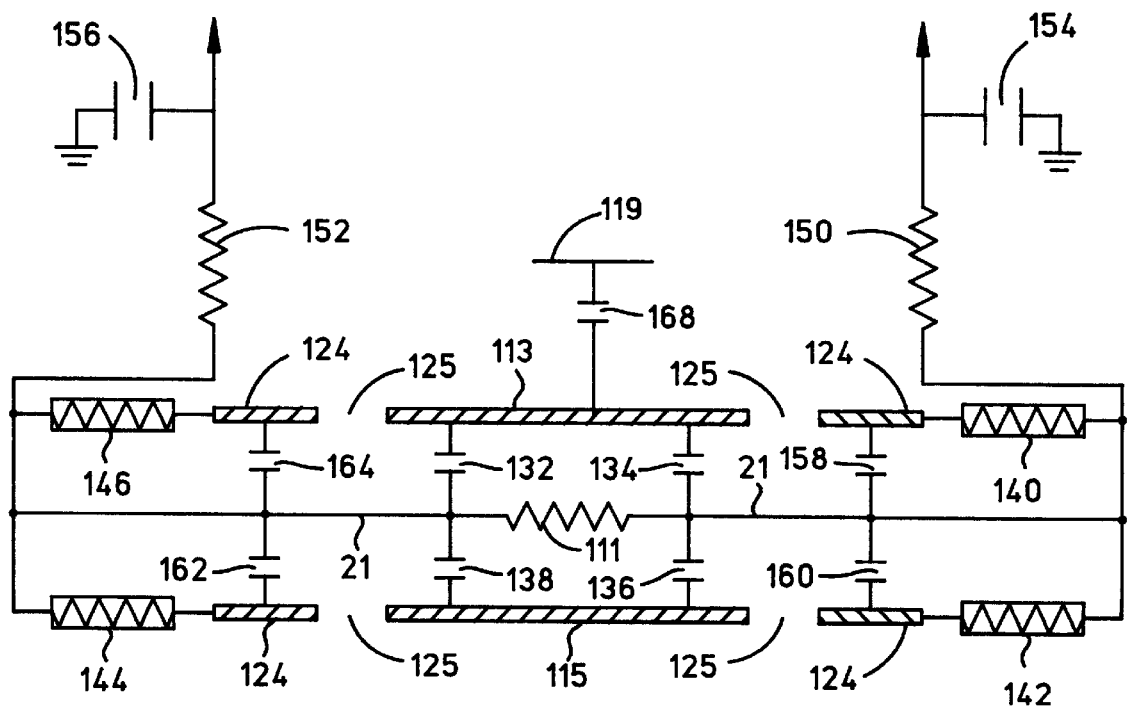
FIGS. 7a and 7b are models of the electrical circuit formed by the inventive MR head shown in FIGS. 6a–6c.

FIG. 7a is a schematic of a model of the electrical characteristics of the first embodiment of the MR head 107 of the present invention. Each of the magnetic shields 113, 115 are capacitively coupled to the sensor leads 21 by capacitors 132, 134, 136, and 138. Each of the capacitors 132–138 represent the capacitance between the shields 113, 115 and the sensor leads 21. For example, capacitor 132 represents the capacitance that exists due to the proximity of the magnetic shield 113 to the sensor lead 21. In addition, a capacitor 168 represents the capacitance between the shield 113 and the substrate 119. An element 140, 142, 144, and 146, such as resistor, diode metal oxide semiconductor field effect transistor (MOSFET), or electro-static discharge (ESD) circuit, is coupled between each parasitic shield 124 and the sensor leads 21. In one embodiment of the present invention, a resistor having a resistance of approximately in the range of 10 kilohms to 100 kilohms is provided in series between the parasitic shield and the sensor element 111. Alternatively, the parasitic shield may be directly electrically coupled to a structure of known electric potential, such as the substrate.

Resistance in the sensor leads 21 due to the length of these leads is represented by resistors 150, 152. In addition, there is a capacitance that exists between the sensor leads 21 and the substrate 119, which is represented by capacitors 154, 156. For the purpose of this discussion, the substrate 119 is considered to be at ground potential.

A capacitance, represented by capacitors 158, 160, 162, 164, also exists between each of the parasitic shields 124 and the adjacent sensor lead 21. As charge accumulates on the magnetic shields 113, 115, the same electrical potential will exist between each of the parasitic shields 124 and the magnetic shields 113, 115 that exists between the sensor element 111 and the magnetic shields 113, 115. That is, any charge that would accumulate on the parasitic shields 124 will be distributed evenly throughout the sensor element 111 and the parasitic shields 124 by the elements 140, 142, 144, 146. Accordingly, if the potential required to cause a sparkover through the gap 125 is less than the potential required to cause a sparkover through the gap between any one of the magnetic shields 113, 115 and the sensor element 111, then no sparkover will ever occur between the magnetic shields 113, 115 and the sensor element 111. That is, no harmful electro-static discharge will occur between the magnetic shields 113, 115 and the sensor element 111, since any charge that accumulates between the magnetic shields 113, 115 and the sensor element 111 will be dissipated by a sparkover between the sensor element 111 and the parasitic shield 124 before it is sufficiently great to cause a sparkover between the sensor element and the magnetic shield. Since the spark gap 125 is not near the air bearing surface 5, the result of a sparkover through the spark gap 125 will be far less disruptive to the operation of the read head 107.

Figure 7B:
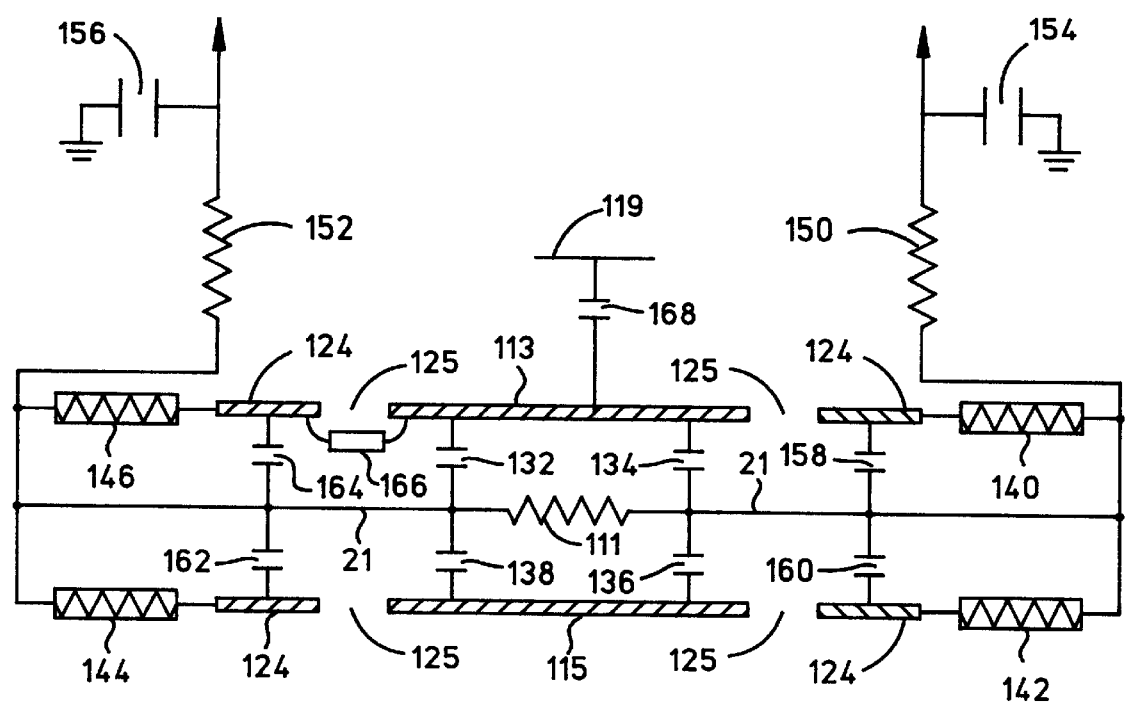

In accordance with another embodiment of the present invention shown in FIG. 7b, a electro-static discharge circuit 166 is placed between at least one of the magnetic shields 113, 115 and at least one of the parasitic shields 124. The electro-static discharge circuit 166 may consist of a single element, such as a P-channel MOSFET, N-channel MOSFET, or a thin film transistor (TFT). In one embodiment of the invention, the gate of the transistor is coupled to either the drain or the source. Alternatively, the gate is coupled to a control circuit, such as the MR circuit. Such a control circuit may then alter the characteristic of the electrostatic discharge circuit 166. In one embodiment of the present invention, the drain is coupled to the parasitic shield 124 and the source is coupled to the magnetic shield 113, 115. Alternatively, the source is coupled to the parasitic shield 124 and the drain is coupled to the magnetic shield 113, 115.

Figure 8:
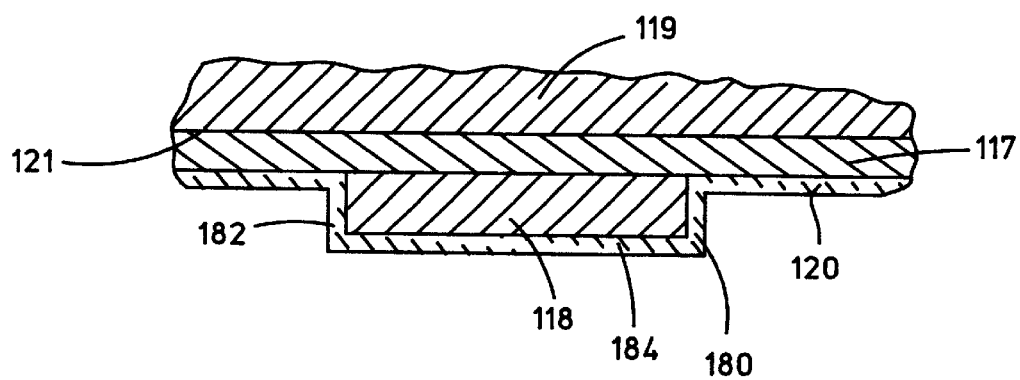
FIG. 8 illustrates one fabrication process in accordance with the first embodiment of the present invention.

FIG. 8 illustrates a first step in one fabrication process in accordance with the first embodiment of the present invention. FIG. 9 is a flowchart of the process steps performed in the inventive method. In accordance with the embodiment illustrated in FIGS. 8, the MR read head is fabricated on a substrate 119. An insulator 117 (such as alumina) is applied to a deposition end 121, such as by being deposited on the deposition end 121 of the substrate 119 (STEP 901). Alternatively, the insulator 117 may be applied by any well-known technique, such as sputtering an insulting material, such as alumina on the substrate 119, introducing a liquid polymer onto the wafer and spinning the wafer to distribute the polymer, or depositing the insulating material by a chemical vapor deposition (CVD) technique.

"Spacer" structures (i.e., spacers) are then formed. In one embodiment of the present invention, the spacers are formed in accordance with a technique disclosed in U.S. Pat. No. 4,256,514, entitled "Method Of Forming a Narrow Dimensioned Region on a Body", issued on Mar. 17, 1981 to Pogge, and assigned to the assignee of the present application. For example, in one embodiment of the present invention, a polysilicon "gate" 118 is applied to the insulator 117 (such as by a conventional semiconductor deposition technique, and conventional photolithography technique or conventional masking technique) (STEP 903). The polysilicon gate is a platform (or step) upon which additional structures may be formed. For example, a layer of material 120 (such as an oxide or nitride layer) is then applied over surfaces 114, 116 of the insulator 117 and the gate 118, such that at least a first and second external side wall 180, 182 and a top surface 184 are formed on the gate 118 in an essentially even coating of the material 120 (STEP 905). The material 120 is preferably selectively removable, such as being selectively etchable.

Figure 10:
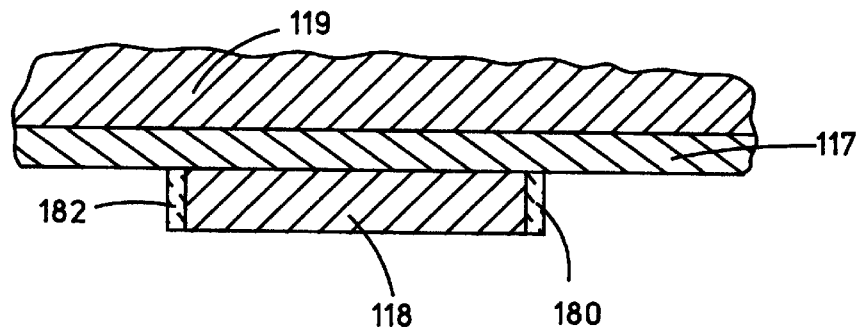
FIGS. 10–16 illustrate additional steps performed in accordance with the method of the present invention.
Figure 11:
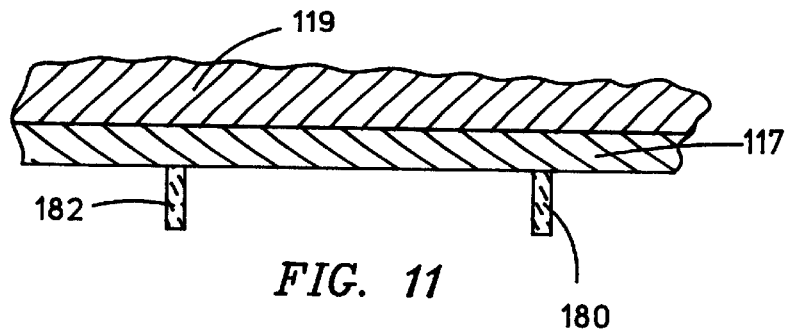

The material 120 is then preferably treated to essentially remove the material 120 that was applied over the insulator 120, leaving only the material 120 that is not coplanar with a plane that is parallel to the interface between the insulator 117 and the substrate 119. For example, oxide may be selectively etched from the alumina and polysilicon without greatly affecting either the alumina or the polysilicon by using any conventional etching agent. After the selective removal, essentially only the external side walls 180, 182 remain, as shown in FIG. 10 (STEP 907). Next, another selective removal process is performed to remove the gate 118 (STEP 909), as shown in FIG. 11. Removal of the gate 118 leaves two very narrow spacers 180, 182 of the material 120.

Figure 12:
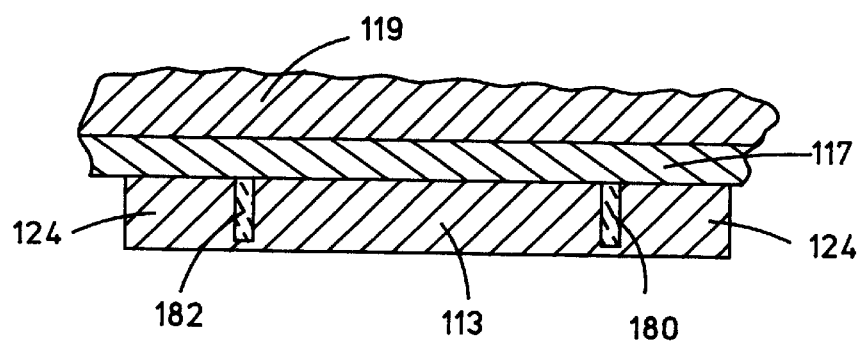
Figure 13:
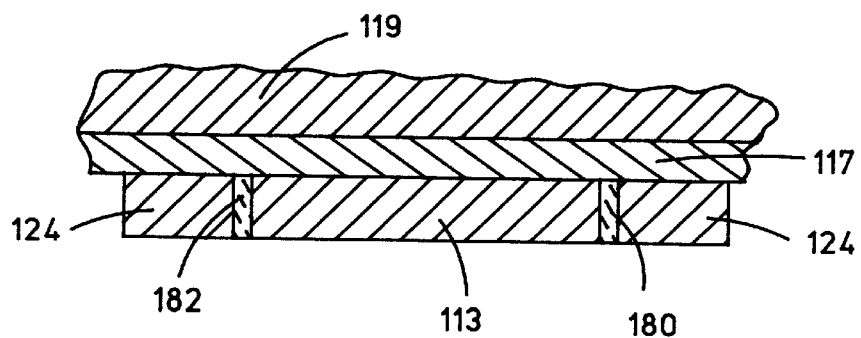

After forming the spacers, a magnetic material (such as nickel/iron permalloy or sendust) is applied to form two parasitic shields 124 and a first magnetic shield 113 (STEP 911), as shown in FIG. 12. Typically, the shields 124, 113 will extend above the spacers 180, 182. Therefore, in the preferred embodiment, the shields 124, 113 are polished (i.e., lapped) down to remove that portion of the shields 124, 113 that is above the spacers 180, 182 (STEP 913), as shown in FIG. 13.

Figure 14:
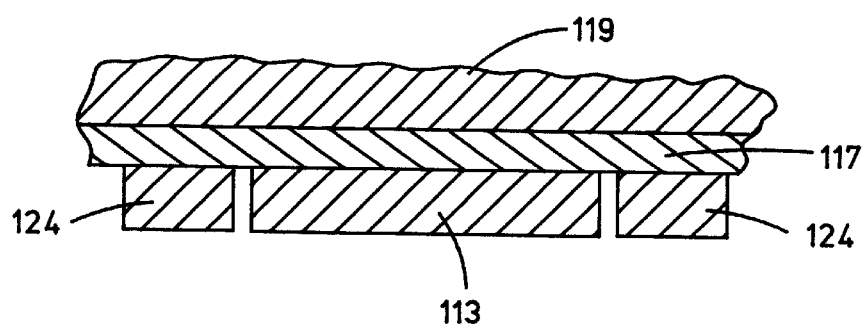
Figure 15:
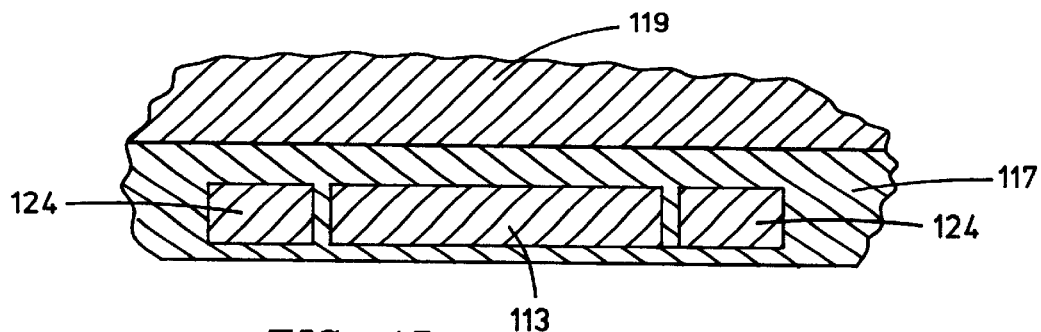
Figure 16:
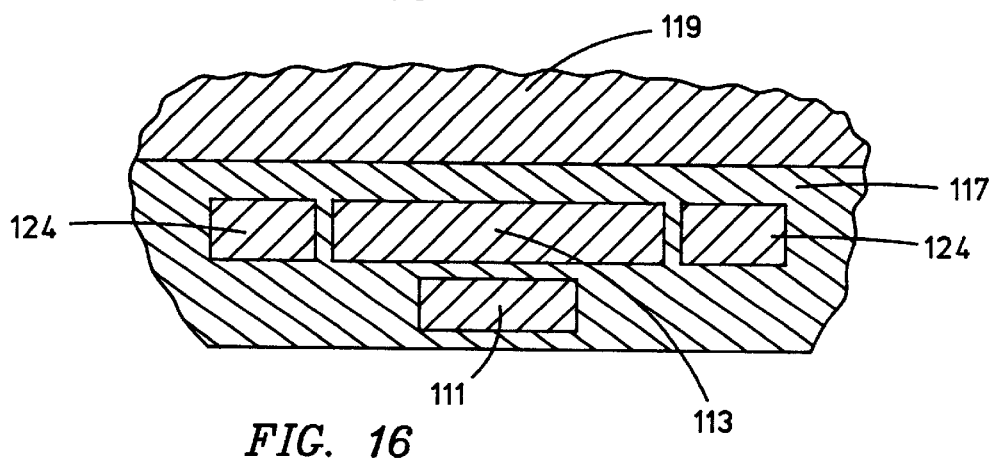

In accordance with one embodiment of the present invention, the spacers 180, 182 are removed by another selective removal process (STEP 915), as shown in FIG. 14. For example, oxide spacers may be removed by an etching process in which any conventional etching agent is applied. Once the spacers 180, 182 have been removed, a second insulating layer of insulating material is applied (STEP 917), as shown in FIG. 15. The second layer of applied insulating material fills the gaps left between the first magnetic shield when the spacers 180, 182 were removed. Alternatively, the spacers 180, 182 may remain, and the second layer of insulation applied over the magnetic shield 113, the two parasitic shields 124, and the spacers 180, 182. In either case, the second layer of applied insulating material preferably becomes a contiguous part of the insulator 117. Next, the sensor element 111 is applied upon the insulator 117 (STEP 919) and a third layer of insulating material is applied over the sensor element 111 (STEP 921), as shown in FIG. 16.

The process used to form the spacers 180, 182 is then preferably repeated to form two additional spacers which are used in the manner described above to form a second magnetic shield 115 and a third and fourth parasitic shield 124 (STEP 923), as shown in FIG. 6a.

In an alternative method, each parasitic shield 124 and the first magnetic shield 113 are formed as a single structure. Two dividing lines are then etched through the structure to separate the structure into the first magnetic shield 113 and each parasitic shield 124. A second insulating layer is then applied over the parasitic shields 124 and the magnetic shield 113. The sensor element is then formed in the manner described above. Next, the second shield 115 and the associated parasitic shields 124 are formed as a single structure. The structure is then divided by etching two lines through the structure to form the gap between the second magnetic shield 115 and the third and fourth parasitic shields 124.

In yet another alternative embodiment, the spacers 180, 182 may be formed by etching three recesses in the insulating material, leaving a first spacer 180 between the first and second recess, and leaving a second spacer 182 between the second and third recess. Except for the manner in which the spacers are formed, the remainder of the method is the same as the method shown in FIGS. 9a and 9b.

Figure 17:
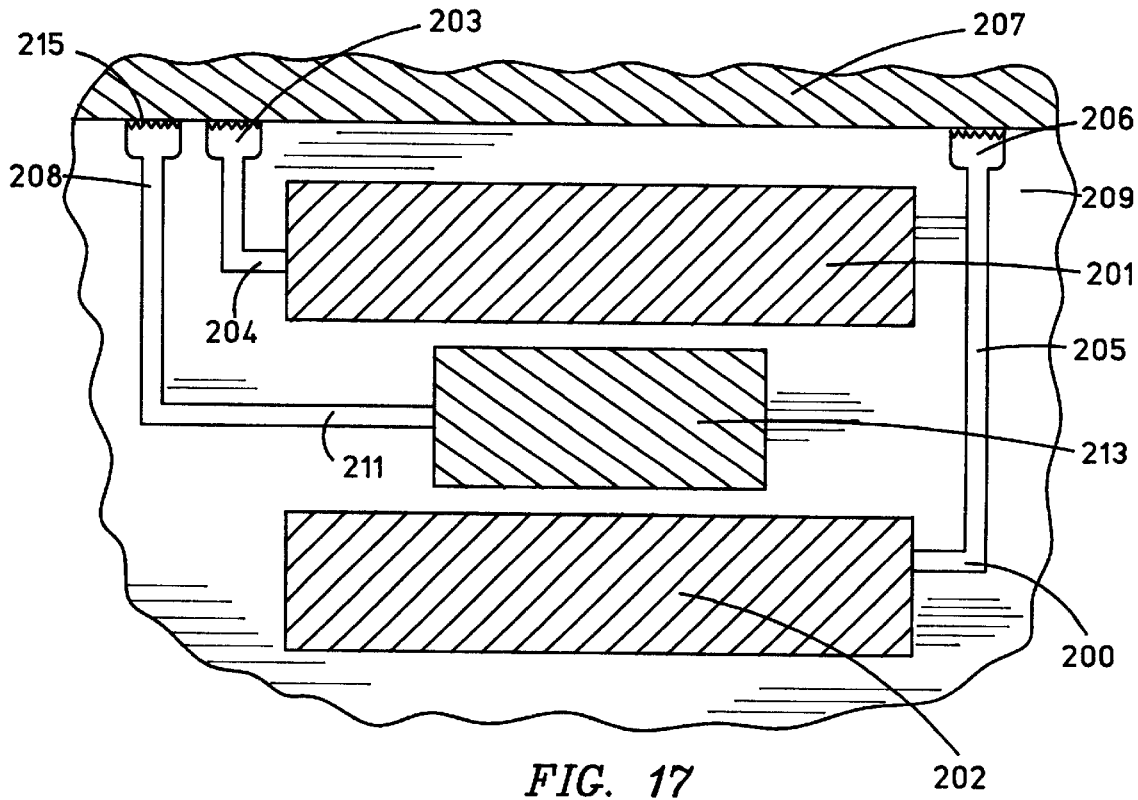
FIG. 17 is an illustration of a second embodiment of the present invention.

FIG. 17 is an illustration of a second embodiment of the present invention. In accordance with the second embodiment of the present invention, the proximal end 200, 204 of a first and second spark gap device 205, 203 are preferably directly electrically coupled to the first and the second magnetic shields 201, 202 respectively. The distal end 206 of each spark gap device 203, 205 is routed to come into close proximity with the substrate 207. The proximal end 211 of a spark gap device 208 is coupled to the sensor 213. The distal end 215 of the spark gap device 208 is routed to come into close proximity with the substrate 207. Alternatively, the proximal end 200, 204, 211 of one or more of the spark gap devices may be in close proximity, but not in contact, with the sensor 213 or the magnetic shield, respectively, and the distal end 215 may be in direct electrical contact with the substrate 207.

Figure 18A:
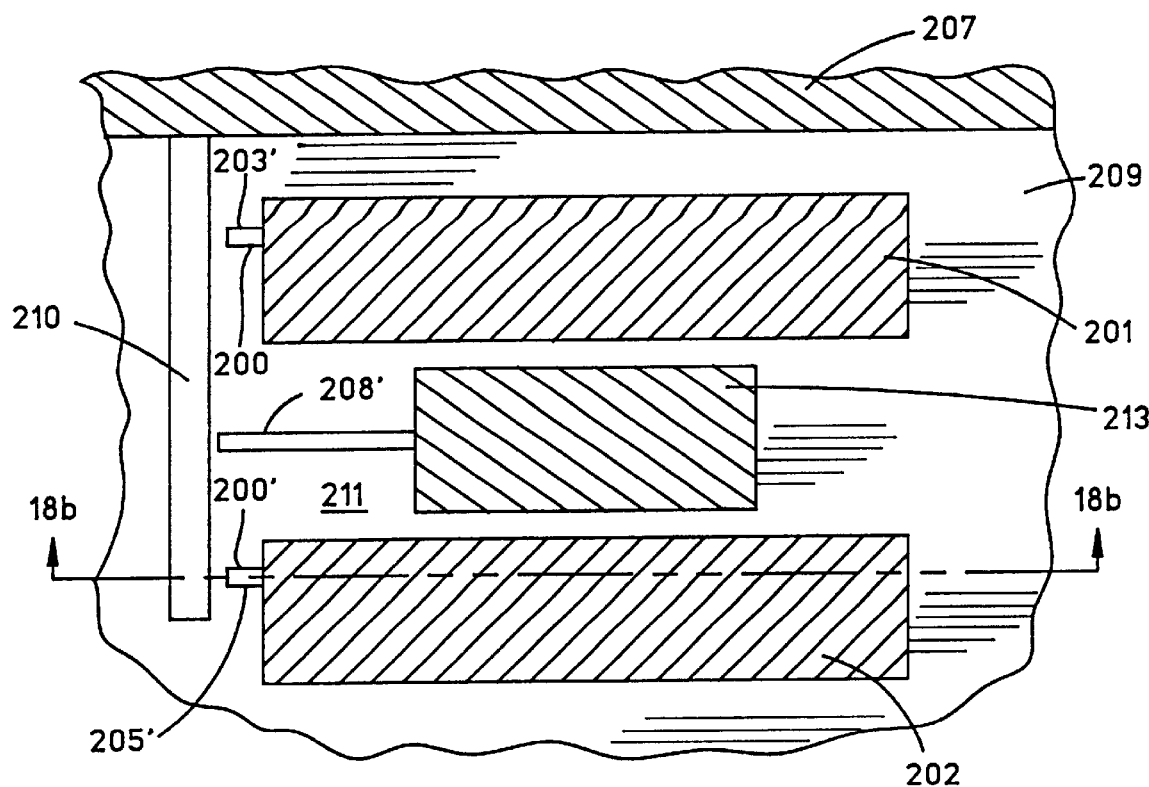
FIG. 18a is an illustration of an embodiment of the present invention using a conductive stud to attract sparkovers.
Figure 18B:
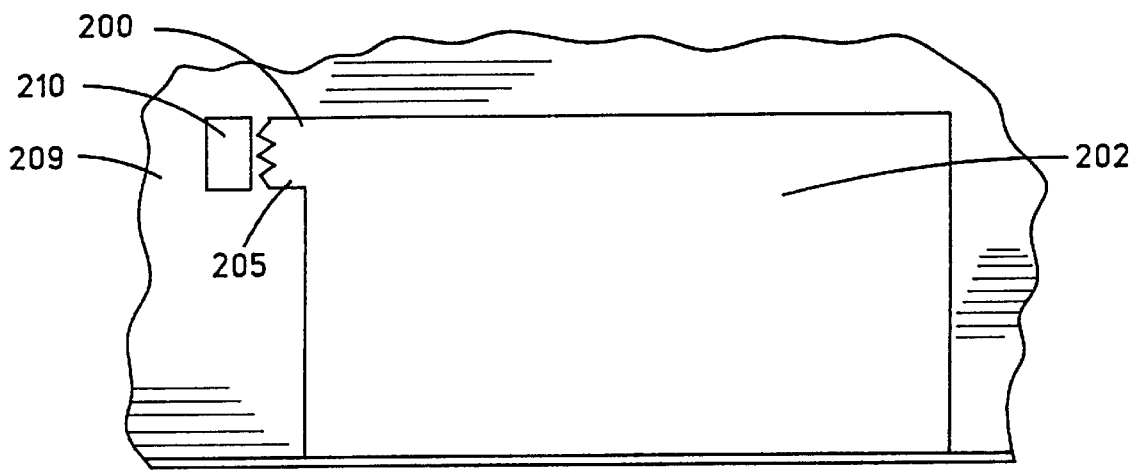

In one embodiment of the present invention, shown in FIG. 18a, a conductive stud 210 extends preferably normal to the interface between the substrate 207 and insulator 209. The stud 210 is electrically coupled to the substrate 207. The proximal end 200, 211 of spark gap devices 203', 205', 208' are coupled to the sensor element 213, the first magnetic shield 201 or the second magnetic shield 202, respectively. FIG. 18b is a cross-sectional view of the present invention taken along the line 18b—18b shown in FIG. 18a. The spark gap device 205' is shown to have HEFDI structures which increase the electric field strength at the gap between the spark gap device 205' and the stud 210. Accordingly, a sparkover will occur at a lower voltage difference between the spark gap device 205' and the stud 210. The HEFDI structures can be formed using conventional thin film deposition techniques.

Figure 19:
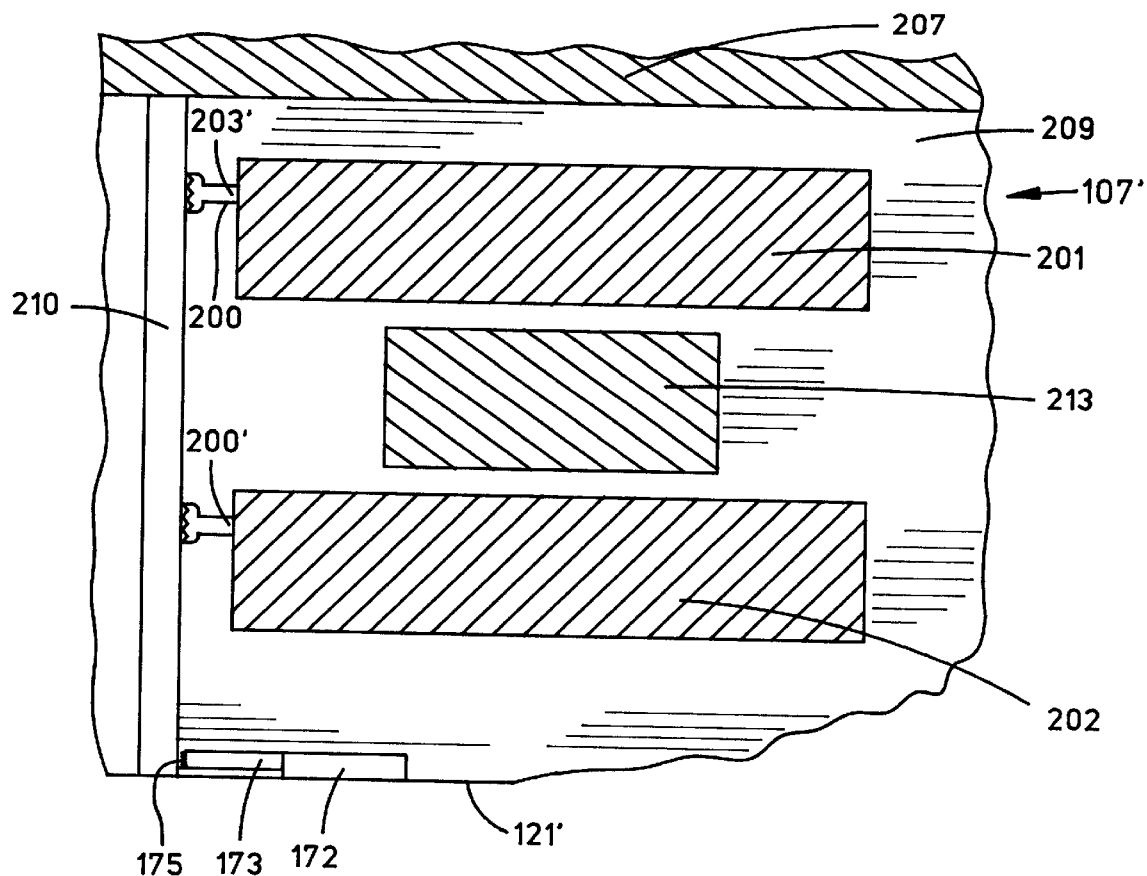
FIG. 19 is an illustration of one embodiment of the present invention in which a pad which connects the sensor element to circuitry outside the read head is shown.

In one embodiment of the present invention, shown in FIG. 19, sensor leads (not shown) electrically couple the sensor element 213 to sensor pads 172 located at the deposition end 121' of the read head 107'. The sensor pads 172 allow the sensor element to be connected to external circuitry. In the embodiment of the present invention shown in FIG. 19, the proximal end of a spark gap device 173 is coupled to the pad 172. The distal end of the spark gap device 173 includes HEFDI structures 175 which are placed in close proximity to the stud 210. In an alternative embodiment, the HEFDI structures 175 are placed in close proximity to the substrate.

Figure 20:
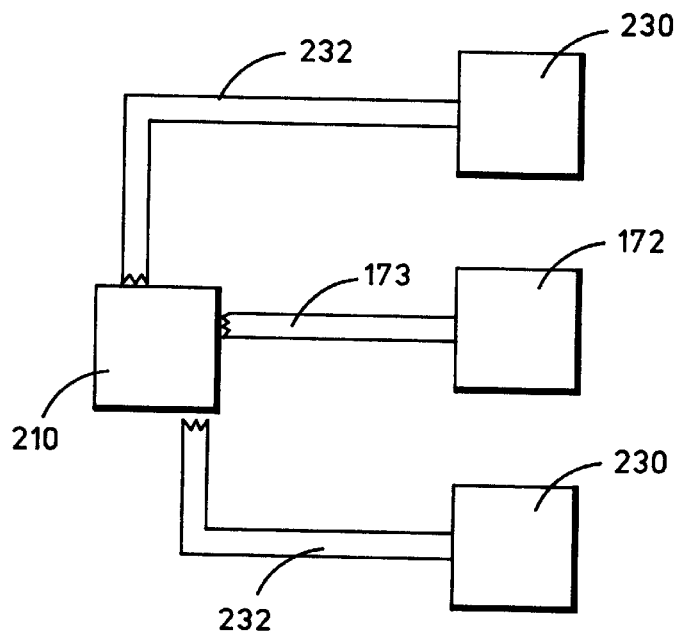
FIG. 20 is a deposition end view of another embodiment of the present invention in which each sheild is also electrically coupled to a pad at the deposition end of a read head.

FIG. 20 is a deposition end view of another embodiment of the present invention in which each shield 201, 202 is also electrically coupled to a pad 230 at the deposition end 121' of a read head in similar fashion to the sensor element 213. Additional spark gap devices 232 may be coupled to each of the pads 230. Each spark gap device preferably has HEFDI structures to increase the strength of the electric field at the gap between the spark gap device and the stud 210.

Each spark gap device 203', 205', 208' is preferably coplanar with the structure to which that spark gap device 203', 205', 208' is coupled. For example, the spark gap device 208' is coplanar with the sensor element 213, such that both the sensor element 213 and the spark gap device 208' can be applied in one process. It will be understood by those skilled in the art that the relative location of the stud 210 is not limited by the particular locations shown in FIG. 18a. Rather, the stud 210 may be located anywhere within the insulator 209 as long as the stud may be placed in direct electrical contact with the substrate 207, and each spark gap device 203', 205', 208' can be brought into close proximity with the stud 210.

FIGS. 21a and 21b are flowcharts of the method of fabricating the read head of FIG. 18a in accordance with one embodiment of the present invention. A first layer of an insulator 209, such as alumina, is applied to a deposition end, such as by being deposited on the deposition end of the substrate (STEP 2101). Alternatively, the insulator 209 may be applied by any well-known technique, such as sputtering an insulting material, such as alumina on the substrate 207, introducing a liquid polymer onto the wafer and spinning the wafer to distribute the polymer, or depositing the insulating material by a chemical vapor deposition (CVD) technique. Next, at least a portion of a first shield 201 is deposited over the insulating material (STEP 2103). The first spark gap device 203' is then applied to the substrate 209 (STEP 2105). In an alternative embodiment, the spark gap device 203' is applied before the first shield 201. It will be understood by those skilled in the art that the spark gap device 203' may be deposited as a thinner element than the shield 201. A second layer of insulating material 209 is then applied over the spark gap device 203' and the first shield 201 (STEP 2106).

Next, the sensor element 213 is applied over the insulating material 209 (STEP 2107). The second spark gap device 208' is then applied to the insulating material 209 (STEP 2109). Alternatively, the spark gap device 208' is applied before the sensor element 213.

A third layer of insulating material is then applied over the spark gap device 208' and the sensor element 213 (STEP 2111). A second shield 202 is then applied over the insulating material 209 (STEP 2113). The third spark gap device 205' is then applied over the insulating material 209 (STEP 2115). In an alternative embodiment, the spark gap device 205' is applied before the second shield 202. Next, a fourth layer of insulating material 209 is applied over the second shield 202 and the spark gap device 205' (STEP 2117).

Next, a hole is formed through the insulating material (STEP 2119) in close proximity to the distal ends of the spark gap devices 203', 208', 205'. In one embodiment, the hole is chemically etched through the alumina in known fashion. Alternatively, the hole is formed by well known reactive ion techniques for selectively removing material. Once the hole is formed, the hole is filed with a conductive material to form the stud 210 (STEP 2121).

The method for fabricating the embodiment shown in FIG. 20 is similar. However, the spark gap devices are not formed until after the stud 210 has been formed. The spark gap devices 203', 205', 208' are applied to the top layer of the insulating material 209. In addition, the pads 230, 172 are formed in contact with conductive connections to each shield 201, 202 and the sensor 213, in known fashion. The spark gap devices 203', 205', 208' are formed in contact with an associated pad 230, 174 and formed with an HEFDI structure in close proximity of the stud 210.

An important aspect of the present invention is the particular geometric configuration of the distal ends 215, 206 of the spark gap devices 203, 203', 205, 205', 208, 208'. Since the gap between sensor element 213 and the magnetic shields 201, 202 is as small as 0.12 μm, it would be very difficult to fabricate a gap between a spark gap device 203, 203', 205, 205', 208, 208' that is smaller than 0.12 gap μm. Therefore, in order to ensure that the sparkover between the sensor element 213 and the magnetic shield 201, 202 does not occur before a sparkover between the sensor element 213 and the substrate through the spark gap device 208, 208', the distal end 215 of the spark gap device 208, 208' must have features that concentrate the electric field. That is, by fabricating the distal end 215 of the spark gap device 208, 208' to have generally pointed structures (i.e., structures preferably having a radius of less than about 1 μm), the electric field that is generated by the difference in potential between the substrate 207 and the distal end of the spark gap device 208, 208' is concentrated in a relatively smaller area. It will be understood by those skilled in the art that the radius may be greater than 1 μm. However, the greater the radius, the less concentrated the charge. Such concentration of the electric field in the insulator 209 will ensure that the sparkover occurs between the spark gap device 208, 208' at a lower electrical potential than is required for a sparkover between one of the magnetic shields 113, 115 and the sensor element 111, or between one of the magnetic shields 113, 115 and the substrate.

A number of embodiments of the present invention have been described. However, it should be understood that each described embodiment is merely intended to serve as an examplar, and is not intended to limit the scope of protection provided. Accordingly, only those limitations specified in the accompanying claims shall be used to define and limit the scope of the present invention. A number of additional variations may be made to the present invention without departing from the present invention. For example, a wide variety of materials may be used to fabricate the substrate, the magnetic shield, and the sensor element. Furthermore, any particular shape may be used at the distal end of the spark gap devices defined by the present invention. Also, a number of different general configurations may be used in which the relative position of the components of a read head are varied. That is, one or more magnetic shields may be curved to wrap around the sensor element. The particular shape of the sensor element may vary from that shown in the accompanying figures. Furthermore, each spark gap device may make contact with each element of the read head at any point of contact. Still further, each spark gap device may follow any conductive path. Furthermore, the stud may be formed from any essentially conductive material. With respect to the embodiment of the present invention in which parasitic shields are provided, a number of methods have been described above for fabricating a read head with parasitic shields. However, a number of alternative methods exist for fabricating such parasitic shields. It should be clear that any of these methods would fall within the scope of the invention described in the present disclosure. Also, while the present invention is described generally in the context of a slider, it will be understood that a read head may be installed or fabricated upon a variety of platforms. Still further, the present invention is described in the context of a read head only for ease of understanding. However, the present invention is applicable to any device which requires protection from electro-static discharge between components that are not electrically coupled, but which are so close that a sparkover may occur between the components at relatively low voltages due to contact of one component with a charged body which transfers charge to that component. Accordingly, the present invention is not to be limited by the particular embodiments that are disclosed herein, but rather by the recitation of the following claims.

What is claimed is:

1. A method for manufacturing a read head protection circuit within a read head having at least one magnetic shield, and at least one sensor element, including the following steps, performed on a substrate:

applying a first layer of insulating material;

applying a first gate structure;

applying a layer of removable material over the first gate structure;

removing a portion of the removable material which is coplanar with a plane that is parallel to an interface between the substrate and the first layer of insulating material;

removing the first gate structure such that at least one vertical wall remains;

applying material to form a first magnetic shield and at least a first parasitic shield; and removing excess material from the surface of the first magnetic shield and each parasitic shield, such that there is no conductive path between the first magnetic shield and any of the parasitic shields.

2. The method of claim 1, further including the following steps performed on the substrate:

applying a second layer of insulating material over the first magnetic shield and each parasitic shield;

applying material to form a sensor element over the second layer of insulating material;

applying a third layer of insulating material over the sensor element;

applying material to form a second magnetic shield and a third and fourth parasitic shield;

applying a second gate structure;

applying a layer of removable material over the second gate structure;

removing that portion of the removable material which is coplanar to a plane that is parallel to said interface;

removing the second gate structure;

applying material to form a second magnetic shield and a third and fourth parasitic shield; and removing excess material from the surface of the second magnetic shield and the third and fourth parasitic shield, such that there is no conductive path between the second magnetic shield and either the third or fourth parasitic shield.

3. A method of making a read head protection circuit for discharging electric charges accumulated on a component of a read head, comprising the steps of:

forming the read head with a substrate;

forming at least one magnetic shield and at least one sensor element on the substrate; and forming at least one electrically conductive elongated spark gap device, having a proximal end directly electrically connected to the magnetic shield, and a distal end formed in close proximity to but spaced from the substrate.

4. The method of claim 3 wherein the distal end of at least one of the at least one spark gap devices is formed with at least one high electric field density inducing device.

5. The method of claim 3 wherein the proximal end of another conductive spark gap device is formed with a proximal end directly electrically connected to the sensor element and a distal end is formed in close proximity to, but spaced from said substrate.

6. A method of making a read head protection circuit for discharging electric charges accumulated on a component of a read head, the read head having at least a substrate, at least one magnetic shield and at least one sensor element, the method of making the read head protection circuit comprising the steps of:

forming at least one electrically conductive stud directly electrically connected to the substrate; and forming at least one conductive spark gap device, having a proximal end directly electrically connected to the magnetic shield, and a distal end formed in close proximity to, but spaced from at least one of the studs.

7. The method of claim 6 wherein the distal end of at least one of the spark gap devices is formed with at least one high electric field density inducing device.

8. The method of claim 6 wherein the proximal end of another spark gap device is directly electrically connected to the sensor element and a distal end is formed in close proximity to, but spaced from said at least one of the studs.

9. A method of making a read head protection circuit for discharging electric charges accumulated on a component of a read head, comprising the steps of:

forming a substrate;

forming a pair of magnetic shields on the substrate;

forming a sensor element between the magnetic shields;

forming a first spark gap device electrically coupled to the sensor element and extending therefrom to a first tip having close proximity to the substrate, and forming one or more second spark gap devices electrically coupled to one or more of the magnetic shields and extending therefrom to a corresponding number of second tips having close proximity to the substrate.

10. The method of claim 9 wherein each of the first and second tips define pointed spark gap inducing devices.

11. A method of making a read head protection circuit for discharging electric charges accumulated on a component of a read head, comprising:

forming a substrate;

forming a pair of magnetic shields on the substrate;

forming a sensor element between the magnetic shields; and forming a conductive structure to maintain the sensor element substantially at an electrical potential of at least one of the magnetic shields, wherein an electrical potential required to cause a sparkover between either of the magnetic shields and the sensor element is greater than an electrical potential required to cause a sparkover between either of the parasitic shields and the adjacent magnetic shield.

* * * * *